March 8, 1960

F. S. ROHATYN 2,927,736

APPARATUS FOR COOLING A DEVICE WHICH PRODUCES
HEAT DURING THE OPERATION THEREOF

Filed April 23, 1954

INVENTOR.
Frederick S. Rohatyn
BY
ATTORNEYS

March 8, 1960 F. S. ROHATYN 2,927,736
APPARATUS FOR COOLING A DEVICE WHICH PRODUCES
HEAT DURING THE OPERATION THEREOF
Filed April 23, 1954 4 Sheets-Sheet 2

INVENTOR.
Frederick S. Rohatyn
BY
ATTORNEYS

INVENTOR.
Frederick S. Rohatyn
BY Edwin Leusol +
Hay Cole
ATTORNEYS

March 8, 1960

F. S. ROHATYN 2,927,736

APPARATUS FOR COOLING A DEVICE WHICH PRODUCES
HEAT DURING THE OPERATION THEREOF

Filed April 23, 1954

INVENTOR.
Frederick S. Rohatyn
BY
ATTORNEYS

United States Patent Office 2,927,736
Patented Mar. 8, 1960

2,927,736

APPARATUS FOR COOLING A DEVICE WHICH PRODUCES HEAT DURING THE OPERATION THEREOF

Frederick S. Rohatyn, New York, N.Y.

Application April 23, 1954, Serial No. 425,095

7 Claims. (Cl. 236—49)

The present invention relates to a cooling and ventilating system for dry type transformers, reactors, and other types of stationary induction apparatus.

In the prior art systems, it had been customary to place a dry type transformer in an enclosure provided with air inlet openings, baffles directing the air in the enclosure, and fans being provided to exhaust the air therefrom. Such transformers are usually rated for both self-cooled and forced-air-cooled operation. The transformer is supposed to operate as a self-cooled unit as long as its load or its winding temperature remains within a certain prescribed limit. When either its load or its winding temperature has exceeded said limit, the fans are put into operation and the transformer is then capable of taking a higher load rate due to the forced air cooling. The fans may be controlled either by means of a manually operated switch or automatically from a suitable thermal control or relay.

It has been found that in an average ambient temperature, a dry type transformer can operate satisfactorily for many years as a self-cooled unit wherein the cooling air flows by natural draft action through the coil ducts of the transformer. However, when the transformer is subjected to a forced-air-cooling operation, the coil ducts are rapidly clogged with dust or other foreign particles which are drawn into the enclosure by the forced air draft. As the spaces and ducts between the windings become clogged, the air circulation through the transformer core and coils is gradually decreased and finally entirely blocked. Thus the transformer temperature rise increases, or the transformer load capacity decreases, and at the same time the dielectric rigidity across the ducts decreases. Therefore, the primary object of the present invention is to obviate the deficiencies of the prior art.

Another object is to prevent the clogging of the coil ducts or coil spaces when the transformer is subjected to the forced air cooling.

Another object is the provision of a cooling system having means to provide filtered air for the transformer when the latter is subjected to a forced air draft and to provide non-filtered air when the transformer is operating as a self-cooled unit.

A further object is to provide means for increasing the air supply when the transformer is operating as a self-cooled unit.

A further object is the provision in a transformer ventilating or cooling system having filtered air inlets for use during a forced-air-cooling operation and dampened non-filtered air inlets for self-cooling operation, of means for automatically opening the dampers of the non-filtered air inlets when the forced air filters become clogged. In this connection a further object is to provide means for energizing an alarm when the filters become clogged.

A still further object is the provision of means for energizing an alarm and for providing for the automatic opening of dampers at the entrance to a non-filtered air inlet when the forced-air-draft flow falls below a predetermined minimum.

The above and other objects, features and advantages of the present invention will be more fully understood from the following description considered in connection with the accompanying illustrative drawings.

In the drawings which illustrate the best mode presently contemplated of carrying out the invention.

Referring now to Figs. 1–7 in detail, a dry type transformer or induction apparatus is generally indicated by the reference numeral 10, said transformer being housed within an enclosure 12 having provision both for natural draft air-cooling operation as well as for forced draft air-cooling operation.

As here shown, the casing or housing 12 is mounted on a base channel frame 14. The front wall of the casing, generally indicated by the reference numeral 16 is constituted, as here shown, by the central panel 18 which is removably mounted as at 20, on an apertured panel 21 removably mounted on the base 14. Panel 21 is provided with brackets 23 which mount a filter assembly 22 in the panel. The panel 18 in turn mounts a fan exhaust assembly 24, as at 26. The rear wall of the casing is generally indicated by the reference numeral 28 and is constituted by a central panel 30 which is removably mounted as at 32, on an apertured panel 33 removably mounted on the base frame 14. Panel 33 mounts an air inlet damper assembly 34. The panel 30, in turn, removably mounts an apertured panel 35 which mounts a second damper assembly 36. The latter provides an air outlet. The top wall or roof 40 of the casing is constituted by the removable panels 42 and 44 which are suitably releasably secured together at 46, the section 44 being releasably mounted by the panel 35 and the panel 42 being releasably mounted by the fan assembly 24. The side or end walls of the casing are generally indicated by the reference numerals 50 and 52 respectively. The side wall 50 is constituted by the removable panels 54, 56 and 58 which are removably secured together between the base 14 and the roof, and the side wall 52 is constituted by the removable panels 60, 62 and 64 which also are removably secured together between the base and the roof.

Figure 5:
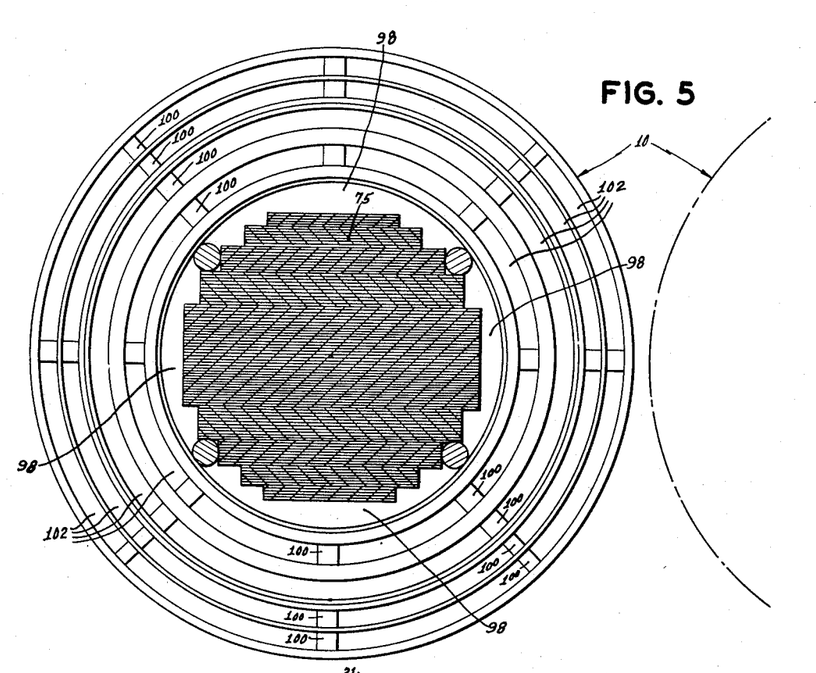
Fig. 5 is a sectional view, on an enlarged scale, taken on the line 5—5 of Fig. 3.
Figure 6:
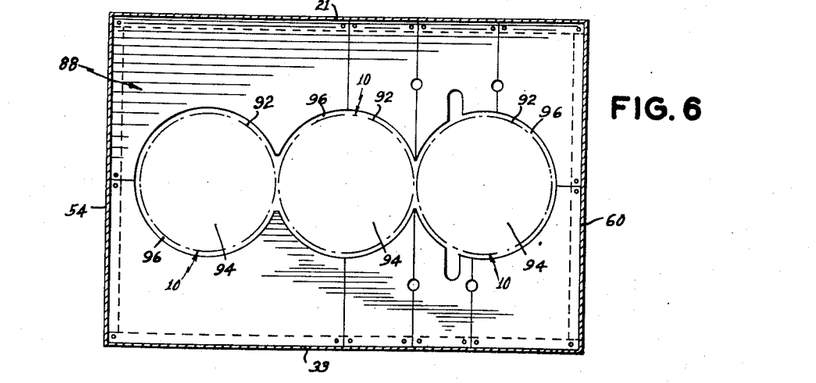
Fig. 6 is a sectional view taken on the line 6—6 of Fig. 3, the transformer being omitted.

In order to mount the transformer in position within the casing 12, provision is made preferably for a pair of spaced parallel I beams 66 within the channeled frame 14. The I beams mount a frame generally indicated at 68 on which the transformer coils are mounted. The frame 68 includes a channel shaped support 70 mounted on each of the I beams 66 for movement in the direction of the arrows 72 for moving the transformer into and out of position within the casing 12. The frame 68 also includes the spaced channel frame members 74 and 76 which extend transversely of and are secured to the base members 70. The core 75 of the transformer is suitably secured to the base members 74 and 76 as by bolts 78. Provision is also made for pressure plates 80 for supporting the coil windings, generally indicated at 82, with reference to the members 74 and 76, as by the bolts 84 and the nuts 86. It will be understood that the enclosure 12, as here shown, has provision to accommodate three transformer coil assemblies which are aligned in a row, as fragmentarily indicated in Figs. 5 and 6. A baffle 88 is mounted in position on brackets 90 provided on panels 21, 33, 54 and 60. It will be noted from Fig. 6 that the baffle 88, as here shown, is constituted by eight separate sections which define with the three openings 94 to accommodate the three transformer coil assemblies. An air passageway 96 is defined in each opening between the outer surface 92 of each coil assembly and the adjacent wall of the baffle opening 94. It will also be noted, as illustrated in Fig. 5, that air ducts or passages 98 are defined between the core 75 and the innermost coil winding in each coil assembly. In addition, spacers 100, formed of suitable insulation material, separate adjacent windings in each assembly, so as to define air ducts or air passageways 102 therebetween. Consequently, it will be apparent that air ducts or air passageways are defined in each coil assembly between the core and the windings, between adjacent windings, and between the outer surface of the coil assembly and the adjacent wall of the baffle opening.

Suitable provision is made for an upper end frame, generally indicated by the reference numeral 104, constituted by the angle members 106 which interconnect the cores of the coil assembly at the upper ends thereof. Suitable provision is also made in the usual manner for bus bars, generally indicated at 108, leading to and from the transformer.

Provision is made, as here shown, on the rear wall of the enclosure 12 for ventilation by natural draft action. More specifically, said provision is constituted by the previously mentioned dampered air inlet assembly 34 and by the dampered air outlet assembly 36, the air inlet assembly being provided adjacent the base 14 and the air outlet assembly being provided adjacent the roof or upper wall 40.

Figure 2:
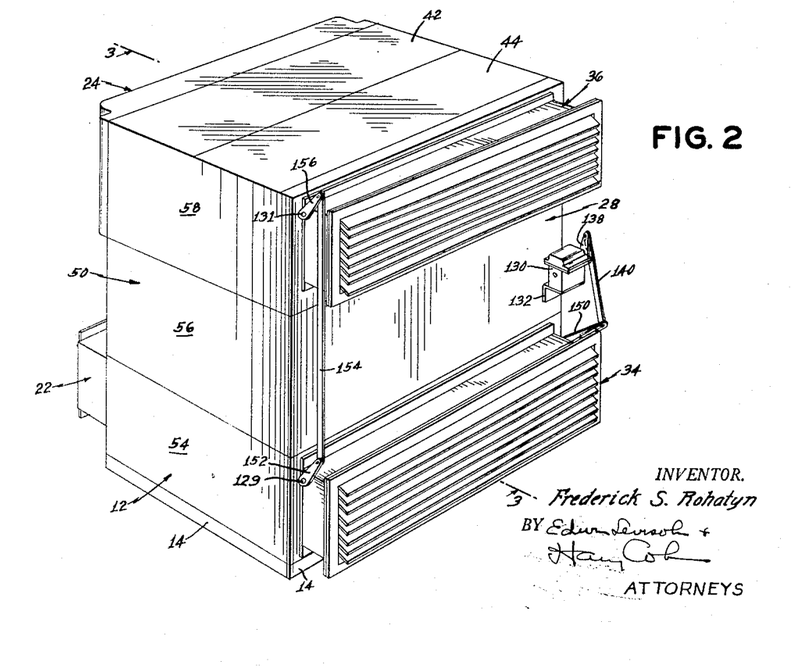
Figure 3:
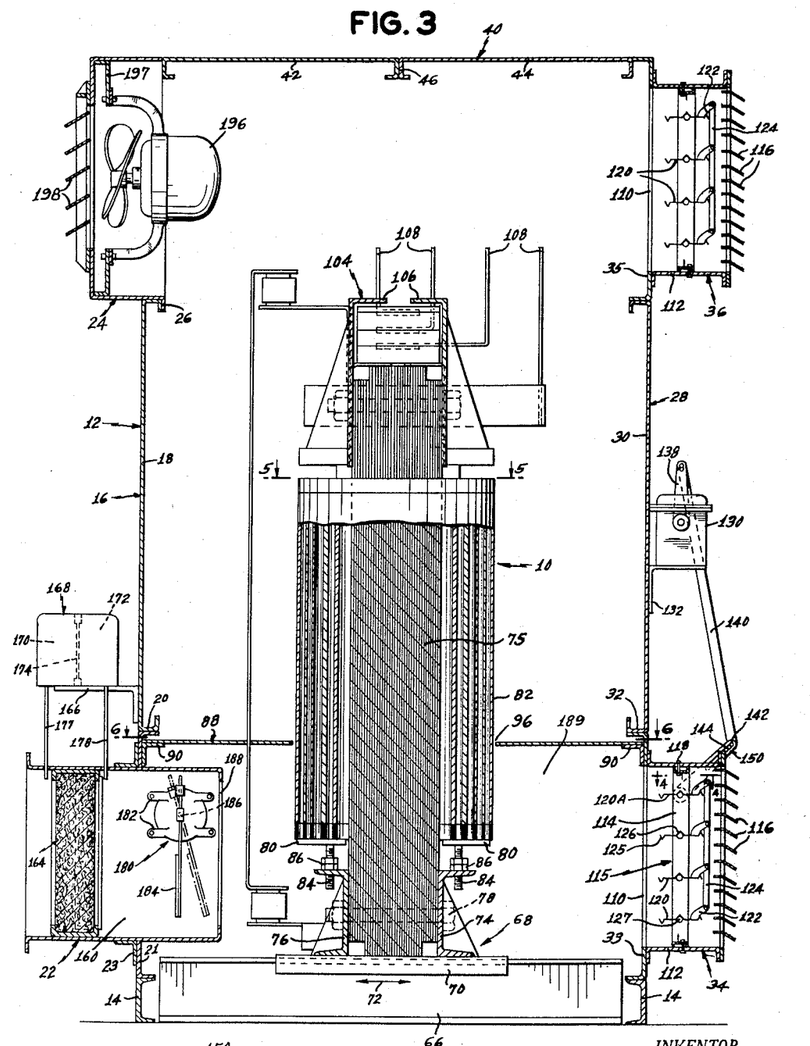
Fig. 3 is a sectional view, on an enlarged scale, taken on the line 3—3 of Fig. 2.
Figure 4:
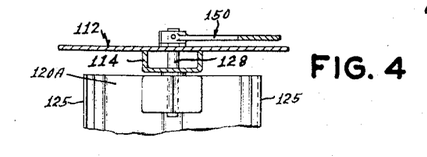
Fig. 4 is a fragmentary sectional view, on an enlarged scale, taken on the line 4—4 of Fig. 3.

The air inlet assembly 34, as previously indicated, is mounted in the lower panel 33 which is provided with an opening 110 therefor. The air inlet assembly 34 is constituted by a housing or duct 112 which overlies the opening 110 in the panel and which is open at both the front and the rear thereof. At its front, the housing is provided with the fixed louvers 116 which extend transversely thereof, and which are deflected downwardly, as best illustrated in Figs. 2 and 3 so as to prevent the entrance of rodents or moisture drippings. Provision is made within the housing 112 for a damper assembly 115 of well known construction. For example, the damper assembly may be the type F-12 illustrated in catalogue No. 150 of the American Foundry and Furnace Company of Bloomington, Illinois. Said damper assembly comprises a channel frame 114 suitably supported within the housing, as by the bolts 118, and provided with a plurality of damper blades 120 pivotally mounted in the frame 114 and extending transversely of the housing 112. The damper blades are interconnected for operation in unison and, in this connection, provision is made on each damper blade for a lug 122. A tie bar 124 interconnects the lugs and is pivoted to each one thereof. It will be noted that each damper blade is provided with a V groove 125 in each edge thereof so as to interlock with the similar edge of the adjacent blade. Each blade is also provided with a V groove in the center thereof such, as at 126, to mount a pivot 127 journalled in the frame 114. As here shown, the upper damper blade 120A of the air inlet assembly 34 is provided with a shaft extension 128, at one end thereof, as illustrated in Fig. 4. Said shaft extension extends through the adjacent portion of the frame 114 and outwardly of the housing 112, and functions as hereinafter described in detail. A similar shaft extension 129, journalled in frame 114 and projecting beyond the housing 112, is provided at the other end of said upper damper blade.

The upper air outlet assembly 36 is substantially similar in construction to the lower air inlet assembly 34. The upper air inlet assembly is also provided with a housing or duct 112 which overlies an opening 110 defined in the adjacent panel 35 to which the assembly is secured. The assembly 36 is also provided with the fixed louvers 116 which deflect downwardly to prevent the entrance of water or moisture drippings into the enclosure 12. Similar provision is made for a channel shaped frame 114 to mount a plurality of damper blades 120 for pivotal movement. Said blades are each provided with a lug 122 and a tie bar 124 pivotally interconnects said lugs. In the present embodiment, the uppermost damper blade of the air outlet assembly 36 is provided with a shaft extension 128 at the left hand end thereof viewing Figure 2.

In order to effect the automatic operation of the damper blades in the air inlet and air outlet assemblies, provision is made for a motor 130 suitably mounted, as by a bracket 132 on the panel 30. The motor 130 preferably is a reversible motor and may be of the type designated as HYCC control motor, manufactured by the Barber-Colman Company of Rockford, Illinois, which is provided with cam operated limit switches 134 and 136 (Fig. 7) for a purpose hereinafter described in detail. A crank arm 138 is operated by the shaft of the motor 130 and said crank arm is pivotally connected to one end of a connecting link 140, the other end of which is engaged, as at 142, in an elongated slot 144 provided in a crank arm 150 which is mounted on the shaft extension 128 provided at the upper right hand end, viewing Fig. 2, of the air inlet assembly 34. The shaft extension 129 provided at the upper left hand end of said assembly is provided with a crank arm 152 which is pivotally connected to one end of the link 154, the other end of which is pivotally connected to a crank arm 156 provided on a shaft extension 131 carried by the upper damper blade in the air outlet assembly 36. It will be understood that the three shaft extensions are all substantially similar.

As here shown, the ratio of the radius of the crank arm 138, provided on the motor 130, to the radius of the crank arm 150 of the damper blade assembly in the air inlet assembly 34, is a one to two ratio, so that a 180 degree rotation of the shaft of the motor 130 is transmitted as a 90 degree rotation of the dampers in the air inlet assembly 34, the reason for which is hereinafter described. It will be apparent that operation of the motor 130, transmitted through crank 138, link 140 and crank 150, results in the operation of the shaft extension 128 carried by the upper damper blade, the operation of the latter operates the tie bar 124 to provide the resultant operation of all the dampers in the air inlet assembly 34. Operation of the upper damper blade also results in the operation of the shaft extension 129 carried at the other end thereof for operating the crank 152 to operate the link 154 which, through the crank arm 156 operates the shaft extension 131 provided on the upper damper blade of the assembly 36 for operating in unison the dampers in the air outlet assembly 36. Consequently, it will be apparent that the motor 130 is effective to operate, in unison, both the air inlet dampers and the air outlet dampers to both the open and closed positions, respectively, thereof.

Figure 1:
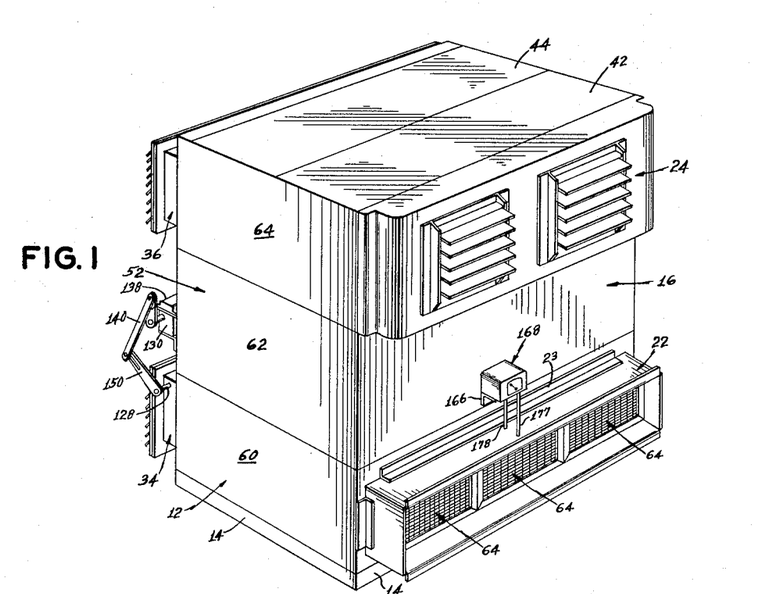
Figs. 1 and 2 are perspective views from the front and rear, respectively, of an enclosure for a dry type transformer, or the like, pursuant to the present invention, the high and low voltage bushings being omitted.
Figures 7, 7A:
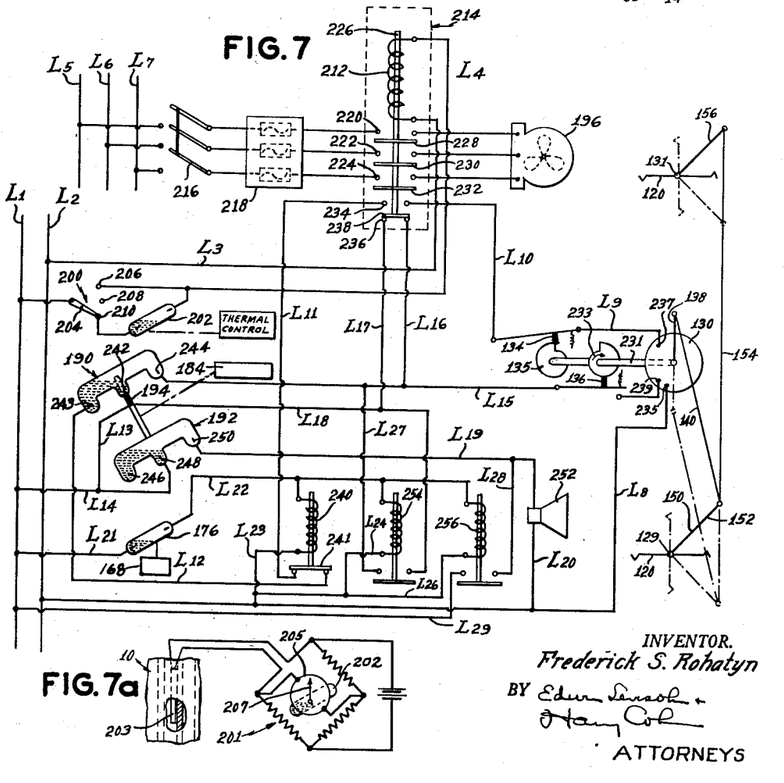
Fig. 7 is a schematic wiring diagram of the control circuit for the ventilating apparatus of the enclosure.
Fig. 7A is a schematic diagram of the thermal control circuit for the thermal control illustrated in Fig. 7.

The filter assembly 22, as here shown, is provided with a plurality of filter units 164 mounted in side by side disposition, three filter units being illustrated in Fig. 1 so as to completely close the front opening to the filter housing 22. Said units are individually movable into and out of the housing 22 for purposes of cleaning, inspection, replacement and repair. It will be understood that each of the filter units 164 is of standard commercial construction and is provided with a suitable filter medium for filtering out the dust particles or other foreign matter which may be present in the ambient atmosphere in and about the enclosure 12. Provision is made on the panel 18 for a bracket 166 which mounts a diaphragm differential pressure control unit 168. Said unit is well known in the art and may be of the type PPQ illustrated and described on page 25 of catalog 700B of the Mercoid Corporation, Chicago, Illinois. Said control unit utilizes two pressure chambers 170 and 172 which are separated by a diaphragm 174 which serves as the power element in actuating a mercury switch 176 (Fig. 7). It will be understood that a microswitch can be utilized in place of a mercury switch. The two chambers are connected by means of the pressure connections 177 and 178 to the filter assembly 22, it being noted that the pressure connection 177 subjects the diaphragm 174 to the pressure at the outer side of the filters 164 and the pressure connection 178 subjects the diaphragm to the pressure at the inner side of the filters. The differential pressure switch 176 operated by the diaphragm 174 is normally open during the forced draft operation of the ventilating system of the present invention, and a variation in pressure differential due to the clogging of the filters 164 results in the operation of the diaphragm 174 to close said switch. Provision is also made in the housing or duct 160, behind the filter units 164, for an air flow or draft-responsive control means 180. As herein illustrated, the control means 180 is a standard commercial type, being preferably an air-vane relay, type EP, illustrated and described in catalog number 42C of the Anderson Manufacturing Company, Boston, Massachusetts. The control 180 is suitably mounted within the housing 160, as indicated at 182, so that the vane 184 thereof, which is mounted for rotation, as at 186, extends into the air flow stream between the outlet side of the filtered units 164 and the housing opening 188 which communicates with the chamber 189 below the baffle 88. It will be readily apparent that the deflection of the vane 184 is proportional to the velocity of the air flow. Said vane serves as the power element for two double throw mercury switches 190 and 192, which are ganged as at 194 for concomitant operation by a predetermined deflection of the air vane 184. The housing 24, in the present embodiment, houses a pair of air-exhaust motor driven fans or blowers 196 which are suitably mounted on a wall member 197 provided therein. An automatic shutter 198, of well known construction, is provided for each of the exhaust fans 196, it being understood however that the shutters 198 can also be motorized shutters. Where the automatic shutter is used, the shutter is in its closed condition when the exhaust fans are inoperative so as to prevent the entrance of moisture drippings, rodents or foreign matter into the casing 12, the shutter being opened by the forced air flow generated by the fans 196.

The transformer 10 operates as a self-cooled unit as long as its load or its winding temperature remains within a predetermined limit. During such operation as a self-cooled unit, the fans 196 are inoperative and the shutters 198 are closed. The air enters through the air inlet assembly 34, and more specifically, through the fixed louvers 116 thereof, which direct the air into the enclosure. The air passes from the fixed louvers 116 through the open dampers 120 into the chamber 189. A certain amount of air also passes through the filter housing 22 into said chamber. The air then rises by normal draft action, or by convection, and passes through the air ducts 98 between the core and the windings, and through the air ducts 102, which are located between the high voltage and the low voltage windings and also within the windings themselves. Some portion of the air also passes through the passages 96 between the outer circumferences of the coil assemblies and the adjacent walls of the openings 94 in the baffle, and said latter portion of the air spills up along the outer surface of the coil assemblies. As a result of temperature differences, and the subsequent natural draft action, the warm air rises and leaves the casing 12 through the air outlet assembly 36 and, more specifically, through the open dampers and the louvers 116 thereof.

When either the transformer load or its winding temperature have exceeded the previously mentioned predetermined limit, it is necessary to provide a forced draft cooling operation for the transformer. This operation can be initiated manually through the operation of a manual switch 200 (Fig. 7) or through the operation of a thermal control 202, here shown as a mercury type switch. The switch 200 is provided with the movable switch arm 204 which has three separate positions. In order to manually close the circuit for initiating the operation of the fans 196, provision is made for the contact 206. The manual "off" position is indicated at 208, and when the switch arm 204 engages contact 210, the apparatus is set for operation by thermal control. While the switch or control 202 may be constituted by a thermal relay suitably positioned at a convenient point on the transformer, or in the casing 12, I prefer to use a control constituted by a Wheatstone bridge 201 (Fig. 7A) having one arm constituted by a resistor 203 whose resistance varies with temperature. The resistor 203 is placed at the "hot spot" of the transformer coil or coils, so that the conductivity thereof will vary with the variations in the heat at said point of the transformer. The Wheatstone bridge is provided with the usual galvanometer indicator 205 and the deflecting needle or pointer 207 of the galvanometer constitutes the power element to operate the mercury switch 202. However the indicator 207 can be used to operate a micro switch in lieu of the mercury switch. The arm 204 of the switch 200 is connected to the power line L1, the companion power line L2 being connected by line L3 to one end of the coil 212 of a motor starter 214. The other end of the coil is connected through the line L4 to the manual "on" contact 206 and to one end of the thermal control switch 202, the other end of which is connected to the contact 210. Three-phase main power lines L5, L6 and L7 provide the power for operating the motors of the fans 196. These lines are connected through a disconnect switch 216, through the fuse box 218, to the normally open contacts 220, 222 and 224, respectively, of the motor starter. Said contacts are closed when the coil 212 is energized to raise its armature 226 so that the bridging segments 228, 230 and 232 thereof close the contacts 220, 222 and 224, respectively, for energizing the fans 196. The motor starter 214 is also provided with the normally open auxiliary contacts 234 and with the normally closed auxiliary contacts 236, provision being made on the armature 226 for an additional bridging segment 238 for alternatively opening and closing the contacts 234 and 236, respectively. The operation of the motor starter, when energized, serves to close said auxiliary contacts 234 which are in an auxiliary control circuit which supplies the current to the control motor 130 for operation thereof to close the dampers in the air inlet housing 34 and in the air outlet housing 36. More specifically, the control motor 130 is connected from its terminal 235, through the line L8, to the power line L2. The circuit for operating the motor to close the dampers is connected from motor terminal 237 through the line L9, the closed limit switch 134 of the motor, through the line L10, through the closed contacts 234 of the motor starter, through the line L11, through the normally closed contacts 241 of a relay 240, through the line L12, through the closed terminals 243 and 242 of the draft control switch 190, and through the lines L13 and L14 to the other power line L1. The control motor will continue to operate in a direction to close the dampers until the cam 135 thereof which operates the switch 134, effects the opening of said switch. This occurs at the point at which the dampers in both the air inlet and air outlet housings are closed. In this connection, it will be noted that it is preferable to have the fans 196 operating at their full speed before the dampers in the housings 34 and 36 are completely closed. In order to achieve this purpose, the control motor 130 is operated at its slowest speed. As previously indicated, a one to two crank arm radius relation is employed between the crank arm 138 of the motor and the crank arm 150 at the other end of the link 140, and consequently a 180 degree motor rotation results in a 90 degree damper rotation so that the closing time for the dampers is doubled. It will also be noted that where a small adjustment can be made in the relation of said crank arm lengths, provision can be made to take advantage of the elastic deformation of the linkage material to provide for a very positive closing. In this connection, the angle of rotation of the damper crank arm can be increased an extra degree from 90 to 91 degrees, so that the extra degree can be used for providing an additional force in a positive closing of the dampers so as to positively interlock the adjacent V grooves thereof. With the dampers closed in both the air inlet and outlet assemblies, and with the fans 196 in operation, it will be apparent that air will enter through the filter assembly 22 passing through the filter units 164, and into the chamber 189 underneath the baffle 88. This chamber operates as an air pressure vessel where static pressure accumulates and from which a dynamic flow starts. Due to the very moderate air velocities which are utilized, the air passes from the chamber through all the coils of the transformer by blowing through all the ducts therein and by also flowing through the passage 96 about the outer periphery or circumference of the coils, the air flow including both the side of the coils at which the filter units are disposed, as well as the opposite sides of the coils adjacent to the air inlet assemblies 34. The air is exhausted by the fans 196 passing through the shutters 198 which have been opened by action of the fans.

Assuming now that the load or the winding temperature of the transformer has dropped below the previously mentioned predetermined limit thereof, provision is made to discontinue the flow of forced cooling air and to provide for a natural draft cooling operation. This can be accomplished manually by throwing switch arm 204 of switch 200 to the "off" position thereof indicated at 208. However, where the apparatus operates under automatic control, the thermally responsive switch 202 operates to its open position when the temperature drops below said predetermined limit. The manual opening of the switch 200, or the automatic opening of the switch 202, results in the de-energization of the motor starter 214 to discontinue the operation of the fans 196.

As previously indicated, and as illustrated, when the fans are inoperative and the dampers are in their open condition, the motor 130 being inoperative, the shaft 231 thereof is so disposed that the limit switch 134 is closed and the limit switch 136 is open. Consequently, upon the energization of the motor starter 214, the motor energizing circuit is completed by the closing of the motor starter contacts 234. This results in a clockwise rotation of the motor shaft 231, as indicated by the arrows 233, until the limit switch 134 opens to discontinue the operation of the motor 130, at which position of the motor shaft the dampers are closed. However, in said position of the motor shaft, the limit switch 136 is closed, while, as indicated, the limit switch 134 is open. However, the circuit which includes the limit switch 136 is open at the contacts 236 while the motor starter is energized. Consequently, when the motor starter is de-energized, either through manual operation of the switch 200 or through automatic operation of the switch 202, the motor starter returns to the open position thereof illustrated in Fig. 7 in which condition the contacts 236 thereof are closed. This now completes a circuit through the motor 130 for rotating the latter in the opposite direction to open the dampers. As previously indicated, the motor is at all times connected from its terminal 235 to the power line L2 through the line L8. The circuit for operating the motor to open the dampers is completed from the motor terminal 239 through the closed switch 136, through the lines L15 and L16, the closed starter contacts 236, and lines L17, L18, L13 and L14 to the other power line L1. The motor shaft now operates in the opposite direction, i.e. is rotating in a counter clockwise direction, or in a direction opposite that indicated by the arrows 233 to open the dampers. This operation of the motor continues until the limit switch 136 is opened whereby to open the motor energizing circuit therethrough and at this point in the rotation of the shaft 231, the limit switch 134 is closed. However, it will be apparent that the motor energizing circuit which includes the limit switch 134 is open at the contacts 234.

Consequently, it will be apparent that in view of the foregoing, the cooling or ventilating operation for the enclosure 12 switches back and forth from a natural draft cooling action to a forced cooling operation, automatically through the operation of the thermal control 202, as required by changes in the load or winding temperature of the transformer. The limit switches 134 and 136 provided in the motor 130 serve to stop the operation of the latter in the closed and opened conditions respectively of the dampers.

While a reversible type motor 130 is preferred because of its adjustable angle of rotation, as previously indicated, it is within the scope of the present invention to utilize other types of motors in lieu of the reversible motor. In this connection, provision can be made for a non-reversible or a uni-directional motor. In this situation, if the ratio of the motor crank arm radius to the damper crank arm radius is one to two, a 180 degree rotation of the motor will be converted into a 90 degree rotation of the damper, as will be readily apparent to those skilled in the art, to permit for the use of a uni-directional motor. In addition, in lieu of either the reversible or the uni-directional motor, a non-reversible motor with spring return can also be used to accomplish the same result. Uni-directional, reversible and spring return motors suitable for use herein are illustrated and described on pages 22–25 of a catalog entitled, "Industrial Controls," published by the Barber-Colman Company, Rockford, Illinois.

As previously indicated, the dampers are normally closed during the forced air cooling or ventilating operation. In this connection, provision is made to automatically open the dampers in the event that the air flow during the forced air or forced draft operation becomes insufficient for any reason. For example, one or more of the fans may fail during the forced air operation and this would result in an insufficient air flow to provide for the proper cooling action. In this connection, provision is made for the previously mentioned draft control device 180 provided with the air vane 184 mounted in the housing 22 of the filter assembly and responsive to the velocity of the air flow through the filter assembly. The air flow device 180 operates the previously mentioned ganged mercury switches 190 and 192. The switch 190 is provided with the terminals 243, 242, and 244, and the companion switch 192 is provided with the terminals 246, 248 and 250. During a forced draft or forced cooling operation of the transformer, the vane 184 is normally sufficiently deflected to close the switch 190 between the terminals 243 and 242 thereof. It will be noted that the portion of the switch 190 which includes the terminals 243 and 242 thereof is in series with the normally closed contacts 241 of the relay 240 and with the contacts 234 of the motor starter 214 in the motor circuit for closing the dampers. In the event that the draft falls below a predetermined velocity, for any reason whatsoever, it will be apparent that the vane 184 will be deflected to a lesser extent than that required and, under such circumstances, the mercury switch 190 will be closed between the terminals 242 and 244 thereof, being opened between the terminals 243, and 242. The opening of the switch 190 between the terminals 243 and 242 thereof interrupts the energizing circuit for the motor 130 from the terminal 237 thereof to the line L1, which is the circuit which has to be completed to cause the motor to operate in a direction to close the damper. However, the closing of the mercury switch 190, between the contacts 242 and 244 thereof, completes a circuit for energizing the motor 130 from the terminal 239 thereof to the power line L1 for opening the dampers. As previously indicated, upon the original operation of the motor 130 in a direction to close the dampers, the limit switch 134 was opened at the end of said operation and the limit switch 136 was closed at the end of said operation so that when the switch 190 closes between its terminals 242 and 244, there is a circuit completed from the terminal 239 of the motor to line L1. This circuit may be traced from the terminal 239, through the closed switch 136, through the line L15, through the switch 190 from the terminal 244 to the terminal 242 thereof, and from the line L13 connected to the terminal 242 through the line L14. This results in the rotation of the motor 130 in the opposite direction to effect the opening of the dampers to supply additional air to the enclosure. Upon said operation of the mercury switch 190, the companion switch 192, which is ganged therewith, also operates to close the latter between the terminals 248 and 250 thereof. It will be noted as previously indicated that the terminal 248 of the switch 192 is connected to the line L1 through the line L14 and further it will be noted that the terminal 250 is connected through the line L19 to one side of an alarm device, here shown as a loudspeaker 252. From the other side thereof, the speaker 252 is connected through the line L20 to the line L8 which is connected to the power line L2. Consequently, it will therefore be apparent that upon any occurrence which results in the reduction of the air flow below a predetermined velocity, during the operation of the fans 196, and while the dampers are closed, provision is made through the medium of the draft control switch 190 to provide for the automatic opening of the dampers, and provision is also made through the companion draft control switch 192 to energize an alarm device 252. It will be apparent that in lieu of a loudspeaker, any other suitable form of alarm device may be used, for example and not by way of limitation, the alarm device may be constituted by a bell or by some form of visible alarm.

Provision is also made herein to provide for an automatic opening of the dampers during a forced draft operation in the event that the filters 164 become clogged so as to cut down on the air flow therethrough. In this connection, provision is made for the previously described differential pressure control unit 168 which operates the differential pressure control switch 176. One terminal of the switch 176 is connected through the line L21 to the power line L1. The opposite terminal of said switch is connected through the power line L22 to one side of the relay coil 240 the other terminal of which is connected through the line L23 to line L8, and through the latter to the other power line L2. Line L22 is also connected to one terminal of a relay 254 the opposite terminal of which is connected through the line L24 to the line L26 which is connected to line L8 through line L23. Line L22 is also connected to one terminal of a relay coil 256 the other terminal of which is also connected to line L26. As previously indicated, the contacts of the relay 240 are closed in the unenergized condition of said relay and it will be noted that the relays 254 and 256 are both open in the unenergized condition thereof. Consequently, it will be apparent that in the event the filter becomes clogged so that there is a predetermined difference in the differential pressure at the opposite sides of the filter, said pressure will be transmitted by the lines 177, 178 to the diaphragm 174 which will operate in a direction to close the switch 176. The closing of the switch 176 will result in the energization of the relay 240 to open the latter and in the energization of the relays 254 and 256 to close both of the latter. The opening of the contacts of the relay 240 results in the opening of the motor circuit between the motor terminal 239 thereof and the line L1. The closing of the contacts of the relay 254 results in the completion of a circuit between the terminal 239 of the motor 130 and the power line L1. This circuit may be traced from the terminal 239 through the closed switch 136, through the line L15, through the line L27 to the closed contacts of the relay 254, and through the lines L18, L13 and L14 to the power line L1. This results in the operation of the motor 130 in the opposite direction to provide for the automatic opening of the dampers. The closing of the relay 256 also results in the operation of the alarm 252. As previously indicated, one terminal of the alarm is connected through the lines L20 and L8 to the power line L2. The other terminal of the alarm is connected through the lines L19 and L28, through the closed contacts of the relay 256 and through the line L29 to the power line L1.

It will also be noted that in the event the motor circuit for opening the dampers should fail in the motor starter 214, that is if the contacts 236 are not properly closed by the bridging element 238, said circuit will be closed either through the draft control switch 190 or through the differential pressure control switch 176, since the draft through the filters with the fans 196 inoperative will drop below the point set for normal draft velocity so that the draft control switch 190 and/or the differential control switch 176 will operate to close the motor circuit from the terminal 239 thereof for opening the dampers.

As previously indicated, the motor circuit from the terminal 237 thereof for closing the dampers includes the portion of the switch 190 between the terminals 243 and 242 thereof, in series with the normally closed contacts of the relay 240, and in series with the motor starter contacts 234. However, in the circuit for operating the motor 130 to open the dampers, namely the circuit from the terminal 239 thereof, the motor starter contacts 236, the contacts of the relay 254, and the portion of the switch 190 between the terminals 242 and 244 thereof are all in parallel circuit connection. However, it will be noted that in the normal condition of the circuit, the contacts 236 are open, the contacts of the relay 254 are open, and the switch 190 is open between the terminals 242 and 244 thereof. This opening circuit provides for the described parallel arrangement of the motor starter contacts 236, the contacts of relay 254, and the switch 190 between terminals 242 and 244 thereof, because when either one of these three components closes the result must be that the dampers must open. This will be readily apparent from the fact that the motor starter contacts 236 will close only when the fans 196 are inoperative so that the dampers must be open. The relay 254 will close only when the differential pressure at the opposite sides of the filters 164 falls below the prescribed limit thereof. Similarly, the dampers must open when the draft through the filter housing 22 falls below a prescribed flow magnitude so as to require that the dampers open. In this connection, it will be also noted that the relay 254 is closed, and the draft control switch 190 is normally closed between its terminals 242 and 244 while the fans are in operation. These components do not have to interrupt the operation of the fans 196 but they merely have to open the fresh air dampers when a situation exists when there is an insufficient air flow velocity through the filters.

Assuming now that the fans are in operation, it will be apparent that the motor starter 214 is energized and that the auxiliary contacts 234 thereof are closed so as to provide for operation of the motor 130 to close the dampers. This circuit is interrupted when the cam operated switch 134 is opened through operation of the shaft 231 at the end of the closing movement of the motor 130. At this point it will be apparent that, as previously indicated, the limit switch 136 is closed and the limit switch 134 is opened. Consequently, when either the draft control switch 190 or the pressure differential switch 176 operated to close the circuit from the motor terminal 239, it will be apparent that the motor would now rotate in the opposite direction to open the dampers. However, as soon as the motor 130 operates through a small angle thereof in the direction to open the dampers, the limit switch 134 closes to provide for the following cycle of operation. Under these circumstances, the possibility existed that the control motor would be energized simultaneously in both its opening and closing circuits, which are electrically displaced by 90 degrees. That is the damper opening circuit from the terminal 239 to the line L1 would be closed through either the section between the terminals 242 and 244 of the draft control switch 190, or through the differential pressure control switch 176, and at the same time, the damper closing circuit from the terminal 237 of the motor to the power line L1 would be closed at the contacts 234 of the motor starter 214, since the motor starter is in the energized condition thereof when the fans are operating. This would ordinarily result in the current flow through both of the energizing circuits in the motor 130 and said current flows would tend to buck each other and possibly damage the control motor. However, to prevent this possibility, both the draft control switch 190 and the differential pressure control switch 176 provide for an inverse relay or switch operation connected in series with each other and connected in series with the fan motor starter control contacts 234 in the circuit from the motor terminal 237. More specifically, it will be apparent that when switch 190 operates to close between the contacts 242 and 244 thereof, said switch opens between its contacts 243 and 242, the latter section of the switch being in series with the contacts 234 in the motor starter circuit, and in addition when the switch 176 is closed, the normally closed relay 240 is energized so that the contacts thereof open, said contacts also being in series with the motor starter contacts 234. Consequently, it will be apparent that when either the draft control switch 190 or the differential control switch 176 operates so as to energize the motor circuit from the terminal 239 thereof to the line L1 to open the dampers, said switches simultaneously interrupt the damper closing circuit between the terminal 237 of the motor and the power line L1. In this manner, there is never any possibility of bucking currents flowing at the same time through both of the electrical windings in the motor 130.

Figure 8:
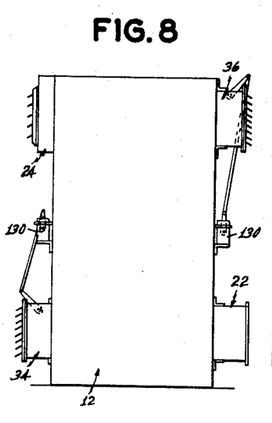
Figs. 8 and 9 are more or less diagrammatic end views of the enclosure illustrating various modifications thereof.
Figure 10:
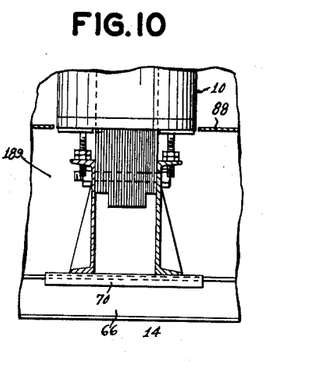
Fig. 10 is a fragmentary view illustrating an alternative mounting arrangement for the transformer within the enclosure.

In the apparatus as presently constructed there is an air velocity of from 350 to 500 feet per minute when the fans 196 are in operation. Where higher air velocities are required, the modification illustrated in Fig. 8 may be utilized. In this modification, the positions of the filter assembly 22 and the air inlet assembly 34 are reversed so that the filter assembly is not at the same side as the fan housing. In this arrangement, the forced draft air enters the filters at the lower part of the rear of the casing and leave the casing at the upper part of the front thereof. In this arrangement, there is no possibility that any of the air flow may "short cut" through one side only of the transformer since the air flow must now come from one side to the opposite side of the casing. This arrangement however requires an additional control motor 130. One of the control motors 130 would operate the dampers at the air inlet 34 and the second control motor would operate the dampers at the air outlet 36 at the same side as the filter assembly 22.

Where still higher air velocities are utilized, provision may be made for the modification illustrated in Fig. 10 pursuant to which the transformer 10 is raised so that the bottoms of the coil windings do not come below the baffle 88. This will prevent any tendency of the pressure collected in the chamber 189 to form pressure pockets and also will prevent the agglomeration or accumulation of pressures at certain points, especially at the opposite ends of the chamber, which might tend to cause the draft to flow up the sides of the transformer at the outer surfaces thereof rather than through the interior transformer ducts at the higher velocities of the air.

Figure 9:
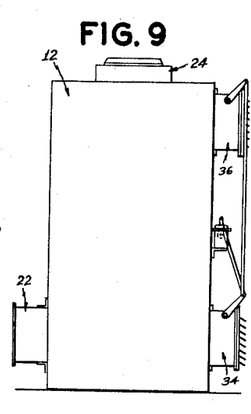

A still further modification is illustrated in Fig. 9. This modification is substantially the same as that illustrated in Figs. 1, 2 and 3 except that the fans are now placed on the roof of the casing rather than at the side thereof.

While the present invention has been illustrated and described in connection with a three phase, three coil group concentrical winding, vertical, core type transformer, it will be understood that it is not limited thereto. For example, and not by way of limitation, the present invention is applicable to transformers of any number of phases, any number and/or arrangement of coils, and, in addition, to transformers with horizontal cores and/or interleafed windings.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent, is:

1. Apparatus for cooling a device which produces heat during the operation thereof comprising, a housing enclosure for said device, said enclosure having motorized exhaust means, air inlet filter means cooperating therewith to provide a forced draft of filtered air therethrough and damper means to provide a natural draft therethrough; control means for operating said damper means to open and close the latter, said control means comprising a reversible motor for operating said damper means, said motor having one terminal connected to a power source, a series circuit between a second terminal of said motor and said power source to operate the motor in a direction to close said damper means, said series circuit including a normally open first limit switch closed by said motor in the open condition of said damper means, normally closed switch means operable to the open condition thereof in response to a predetermined pressure difference between opposite sides of said filter means and normally closed switch means operable to the open condition thereof in response to a forced draft below a predetermined velocity, whereby said damper means will not close if the filter means is clogged and/or if the forced draft velocity is below said predetermined level, and a circuit between a third terminal of said motor and said power source to operate the motor in the opposite direction to open said damper means, said latter circuit comprising a normally open second limit switch closed by said motor in closed condition of said damper means, first normally open switch means connected between said second limit switch and said power source and operable to the closed condition thereof in response to said predetermined clogging of said filter means, and second normally open switch means in parallel with said first normally open switch means, said second normally open switch means being operable to the closed condition thereof in response to a forced draft below said predetermined velocity, whereby said damper means will open if the filter means is clogged and/or if the forced draft velocity is below said predetermined velocity.

2. Cooling apparatus, as defined in claim 1, further characterized in the provision of a motor starter for said exhaust means, said motor starter including normally open auxiliary contacts provided in said series circuit which are closed upon energization of said exhaust means, and normally closed auxiliary contacts in the circuit for said third terminal, said normally closed contacts being opened upon energization of said exhaust means, and said normally closed contacts being connected in parallel with said first and second normally open switch means, and means for energizing said motor starter in response to a predetermined temperature within said enclosure.

3. Apparatus for cooling a device which produces heat during the operation thereof comprising, a housing enclosure for said device, first and second air inlet means provided in said enclosure, said second air inlet means having filter means, first and second air outlet means provided in said enclosure, said first air inlet means and said first air outlet means each having normally open damper means to provide a natural draft through said enclosure for cooling said device, blower means cooperating with said second air inlet means and with said second air outlet means to provide a filtered forced draft through said enclosure when said blower means is energized, motor operated control means for opening and closing said damper means in unison, and means operable in response to the energization of said blower means to energize said motor operated control means for positively closing said normally open damper means and provide a forced filtered air draft through said enclosure for cooling said device.

4. Apparatus for cooling a device which produces heat during the operation thereof comprising, a housing enclosure for said device, first and second air inlet means provided in said enclosure, said second air inlet means having filter means, first and second air outlet means provided in said enclosure, said first air inlet means and said first air outlet means each having normally open damper means to provide a natural draft through said enclosure for cooling said device, blower means cooperating with said second air inlet means and with said second air outlet means to provide a filtered forced draft through said enclosure when said blower means is energized, control means for opening and closing said damper means in unison, means operable in response to the energization of said blower means for positively closing said normally open damper means and provide a forced filtered air draft through said enclosure for cooling said device and means operable in response to a predetermined reduction in air flow through said enclosure during the forced filtered draft operation therethrough to positively open said damper means and reinstate said natural draft through said enclosure.

5. Apparatus for cooling a device which produces heat during the operation thereof comprising, a housing enclosure for said device, first and second air inlet means provided in said enclosure, said second air inlet means having filter means, first and second air outlet means provided in said enclosure, said first air inlet means and said first air outlet means each having normally open damper means to provide a natural draft through said enclosure for cooling said device, blower means cooperating with said second air inlet means and with said second air outlet means to provide a filtered forced draft through said enclosure when said blower means is energized, motor operated control means for opening and closing said damper means in unison, means operable in response to the energization of said blower means to energize said motor operated control means for positively closing said normally open damper means and provide a forced filtered air draft through said enclosure for cooling said device and means operable in response to a predetermined reduction in air flow through said enclosure during the forced filtered draft operation therethrough to energize said motor operated control means for positively opening said damper means and reinstate said natural draft through said enclosure.

6. Apparatus for cooling a device which produces heat during the operation thereof comprising, a housing enclosure for said device, first and second air inlet means provided in said enclosure, said second air inlet means having filter means, first and second air outlet means provided in said enclosure, said first air inlet means and said first air outlet means each having normally open damper means to provide a natural draft through said enclosure for cooling said device, blower means cooperating with said second air inlet means and with said second air outlet means to provide a filtered forced draft through said enclosure when said blower means is energized, motor operated control means for opening and closing said damper means in unison, means operable in response to the energization of said blower means to energize said motor operated control means for positively closing said normally open damper means and provide a forced filtered air draft through said enclosure for cooling said device and means operable in response to a predetermined change in pressure difference between opposite sides of said filter means during the forced filtered draft operation through said enclosure to energize said motor operated control means for positively opening said damper means and reinstate said natural draft through said enclosure.

7. Apparatus for cooling a device which produces heat during the operation thereof comprising, a housing enclosure for said device, first and second air inlet means provided in said enclosure, said second air inlet means having filter means, first and second air outlet means provided in said enclosure, said first air inlet means and said first air outlet means each having normally open damper means to provide a natural draft through said enclosure for cooling said device, blower means cooperating with said second air inlet means and with said second air outlet means to provide a filtered forced draft through said enclosure when said blower means is energized, motor operated control means for opening and closing said damper means in unison, means operable in response to the energization of said blower means to energize said motor operated control means for positively closing said normally open damper means and provide a forced filtered air draft through said enclosure for cooling said device, means operable in response to a predetermined reduction in air flow through said enclosure during the forced filtered draft operation therethrough to energize said motor operated control means for positively opening said damper means and reinstate said natural draft through said enclosure, and alarm means energized in response to said predetermined reduction in air flow.

References Cited in the file of this patent

UNITED STATES PATENTS

| | | |
|---|---|---|
| 1,546,450 | Meaker | July 21, 1925 |
| 1,845,954 | Bird | Feb. 16, 1932 |
| 2,165,523 | Wolf | July 11, 1939 |
| 2,167,472 | Bedford | July 25, 1939 |
| 2,235,152 | Grutzner | Mar. 18, 1941 |
| 2,289,882 | Myers | July 14, 1942 |
| 2,459,322 | Johnston | Jan. 18, 1949 |
| 2,551,956 | Lund | May 8, 1951 |
| 2,577,104 | Butler | Dec. 4, 1951 |
| 2,636,683 | Hill | Apr. 28, 1953 |
| 2,761,101 | Camilli et al. | Aug. 28, 1956 |